Nov. 15, 1966    J. PELTNER ETAL    3,285,100
SHIFTABLE MULTI-SPEED TRANSMISSION
Filed July 15, 1963    2 Sheets-Sheet 1
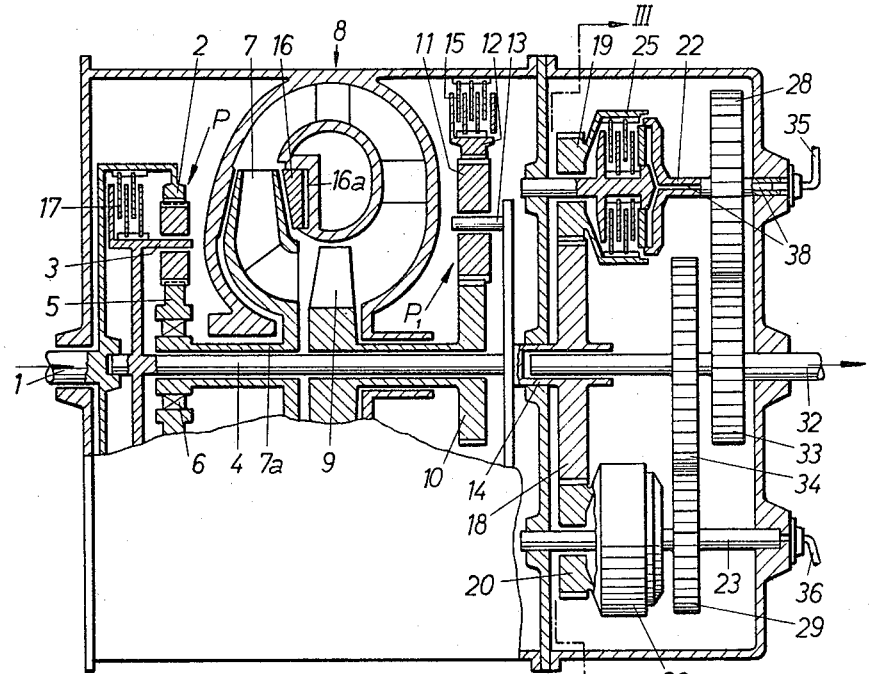
Fig. 1
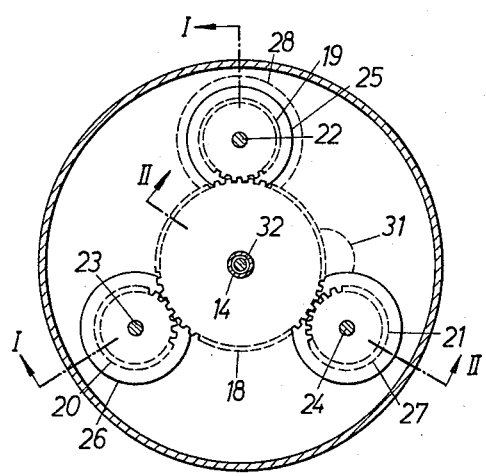
Fig. 3
Fig. 2
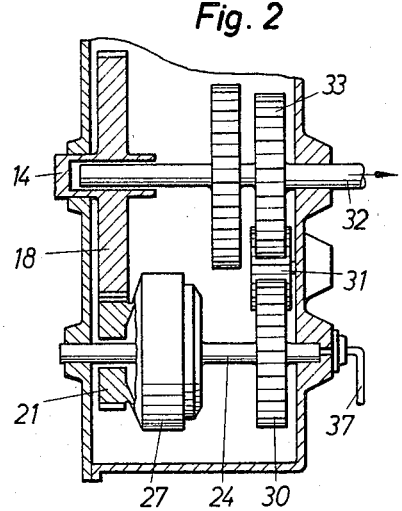
INVENTORS
Johannes Peltner
Helmut Weinrich
BY

United States Patent Office 3,285,100
Patented Nov. 15, 1966

3,285,100
SHIFTABLE MULTI-SPEED TRANSMISSION
Johannes Peltner, Sontheim, Stubental, and Helmut Weinrich, Heidenheim (Brenz), Germany, assignors to Voith-Getriebe-KG., Heidenheim (Brenz), Germany
Filed July 15, 1963, Ser. No. 294,846
Claims priority, application Germany, July 21, 1962,
V 22,815
4 Claims. (Cl. 74—688)

The present invention relates to a multi-speed transmission with three, four or more velocity ranges. Transmissions of this type with counter-shaft means as well as with planetary gear means are known. With the last mentioned type of transmissions, as a rule, a plurality of sets of planetary gear transmissions are provided the number of which frequently corresponds to the number of velocity ranges. These planetary gear transmission sets are arranged axially one behind the other in order to obtain the required transmission ratios and in order to be able to mount the respective control brakes and clutches pertaining thereto. The length of such transmissions, in most instances, is considerable. While it is possible with one single planetary gear transmission to obtain at least three different velocity ranges, there exist certain limits with regard to the transmission ratios and output driving operations as a result of which it is not possible to meet all requirements of operation.

The further known designs with counter-shaft transmissions afford greater possibilities concerning transmission ratios and the direction of rotation of the output shaft, but they require considerable space.

There has been suggested a counter-shaft transmission with aligned input shaft and output shaft and two counter-shafts parallel thereto and with a number of shiftable clutches corresponding to the number of velocity ranges. These shiftable clutches are located between the gears on the counter-shafts and serve for selectively engaging two gears each of each counter-shaft. Furthermore, a gear of each counter-shaft meshes with an input gear common to all counter-shafts and keyed to the input shaft, whereas the remaining gears of the counter-shaft are drivingly connected to the output shaft. In connection with such transmissions it is known to design the said input gear together with the counter-shaft gears for a step-up ratio.

The heretofore known counter-shaft transmissions of this type, however, have a considerable length if they are designed for three or more velocity ranges. This is due to the fact that on at least one of the counter-shafts there have to be mounted at least three gears and at least one clutch, in most instances even two clutches.

It is, therefore, an object of the present invention to provide a shiftable three or more velocity range gear transmission which will overcome the above mentioned drawbacks.

It is a further object of this invention to provide a gear transmission as set forth in the preceding paragraph with aligned input and output shaft, which will have a short length and will be built in compact manner so as to take into account the restricted space available in motor vehicles.

It is still another object of this invention to provide a shiftable multi-speed gear transmission in combination with a fluid flow circuit, which, while affording a relatively high number of velocity ranges, requires only relatively little space.

These and other objects and advantages of the invention will appear more clearly from the following specification in connection with the accompanying drawings, in which:

FIG. 1 is a diagrammatic longitudinal section through a transmission according to the present invention including a differential gear transmission followed by a three velocity range countershaft transmission, said section being taken along the line I—I of FIG. 3.

FIG. 2 represents a partial section through FIG. 3 taken along the line II—II thereof.

FIG. 3 represents a cross section through FIG. 1 taken along the line III—III thereof.

Figure 4:
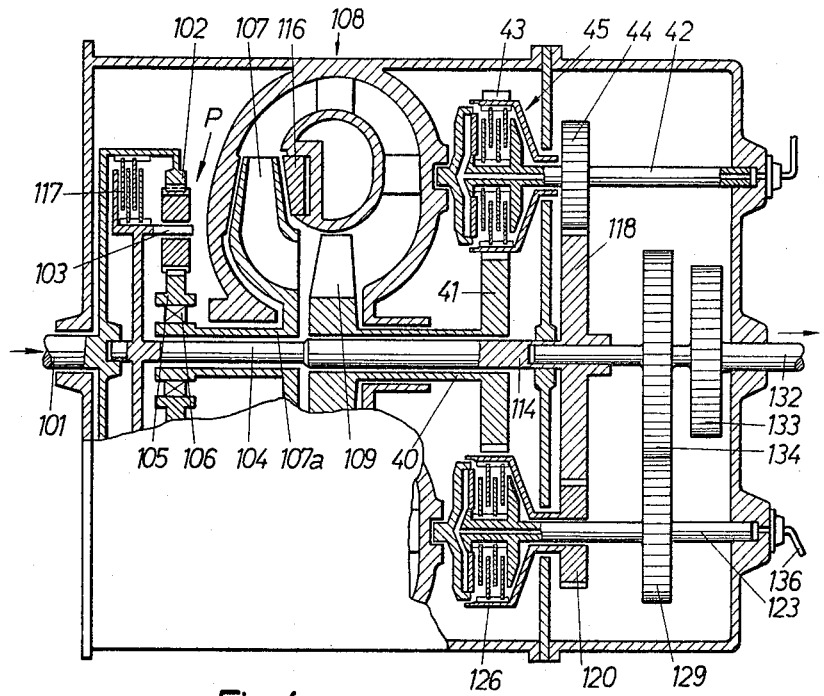
FIG. 4 is a diagrammatic longitudinal section through a modified transmission according to the present invention.

The present invention is based on a counter-shaft transmission in which shiftable clutches may be located not only between the counter-shaft gears but also adjacent thereto. In order to obtain a structure of a short length while nevertheless providing the necessary number of velocity ranges, the present invention provides one counter-shaft each for each set of counter-shaft gears and each counter-shaft is, in a manner known per se, provided with two gears only and one shiftable clutch. Furthermore, in conformity with the present invention, the said counter-shafts are, preferably uniformly, distributed over the circumferential range of the input and output shafts.

According to a further feature of the present invention, for purposes of saving space, the shiftable clutches are arranged along a common plane perpendicular to the transmission shafts and, as far as possible, are of identical design to thereby reduce the cost of the transmission.

The shiftable clutches may be actuated hydraulically or pneumatically by a corresponding pressure fluid. In such an instance, a very simple and safe supply of the pressure fluid may be assured by providing the corresponding feeding lines to the chutches so that they extend from one end of each counter-shaft through a central bore in the respective counter-shaft.

According to a further development of the present invention, there is provided a particularly advantageous combination of the counter-shaft transmission according to the invention with a fluid flow circuit such as a fluid coupling or a torque converter. More specifically, the shiftable counter-shaft transmission according to the invention may be combined with a so-called differential torque converter transmission comprising a hydraulic power path with torque converter and a mechanical power path arranged in parallel thereto, and a differential gear transmission which connects the input side of said two power paths with the input shaft of the differential torque converter transmission. According to a further development of the invention, it is suggested to arrange the shiftable counter-shaft transmission directly behind the fluid flow circuit or directly behind the differential torque converter transmission. This is preferably done in such a way that the shiftable transmission and the fluid circuit transmission and the differential torque converter transmission are arranged coaxially with regard to each other and together form a structural unit. Such a combination results in a construction which is particularly favorable with regard to space requirement because the fluid circuit in itself requires a relatively large transmission diameter while the counter-shafts distributed over the circumferential range of the shiftable transmission-input shaft are located entirely or almost entirely within said diameter range so that, for all practical purposes, they do not require an increase in the diameter of the transmission. On the other hand, a short axial length and a very compact structure will be obtained.

Referring now to the drawing in detail, the transmission illustrated therein comprises an input shaft 1 for connection with a prime mover. Connected to input shaft 1 is the gear ring or outer gear 2 of a power dividing planetary gear transmission—differential gear transmission—generally designated P. The planetary gear carrier 3 of transmission P is fixedly connected to a central shaft 4. These members, viz. shaft 1, planetary gear transmission P and central shaft 4 represent the mechanical branch or power path of the differential torque converter transmission shown in the drawing. As will be evident from the drawing, the sun-wheel 5 of the differential gear transmission is adapted through the intervention of a free wheel drive 6 drivingly to be connected to the pumping wheel 7 of a torque converter 8, of known construction, such as illustrated and described in Patent No. 3,075,410 to Weinrich et al. The turbine wheel 9 of said torque concerter 8 rotates in the opposite direction to pumping wheel 7 and transfers its torque to the output shaft 14 through the interventon of a planetary gear transmission generally designated P1 and comprising the members 10, 11, 12 and 13. The said output shaft 14 is fixedly connected to the planetary gear carrier 13 and also to the central shaft 4—mechanical transmission path. Shaft 14 represents the output shaft of the differential torque converter transmission. The hydraulic transmission path of the said differential torque converter transmission is represented by the transmission branch associated with the torque converter 8 and comprising the elements 6 to 13.

As will furthermore be evident from the drawing, the gear ring or outer gear 12 of the planetary gear transmission P1 is adapted selectively to be braked fast by means of a multi-disc brake 15. For purposes of saving space, particulary in axial direction, and for obtaining a compact structure, the said brake 15 is advantageously arranged so as coaxially to surround the outer gear 12.

*Operation*

The operation of this differential torque converter transmission is as follows: In the low velocity range, the multi-disc brake 15 is engaged so that the transmission will operate with power division which means that due to the power dividing planetary gear transmission 2, 3 and 5, the torque is transferred partially via the hydraulic power path 6–13 and partially via the mechanical power path 34. At the output shaft 14, both power paths join again. This power dividing operation will, on one hand, assure the advantages of a hydraulic operation with torque converter—high starting conversion, soft shock-free starting, etc.—with a relatively favorable degree of efficiency in view of the purely mechanical transmission branch.

If, however, the multi-disc brake 15 is disengaged, and the pump wheel 7 is braked fast, for instance by conveying a pressure fluid into the annular chamber 16a so as to move an annular piston 16 toward the left (with regard to FIG. 1) for braking engagement with pumping wheel 7, the hydraulic transmission branch is made effective, and the power transmission is now effective purely mechanically through the member 2, 3 and 4 to the output shaft 14. If in this connection additionally a multi-disc clutch 17 is engaged whereby the outer gear 2 is coupled to the planetary gear carrier 3 of planetary gear transmission P, a further purely mechanical velocity range is obtained with a transmission ratio of 1:1—direct power transmission. In this instance, the free wheel drive 6 makes possible a rotation of the sun-wheel 5 relative to the stationary hollow shaft 7a of the pumping wheel 7.

In addition to the above, a braking velocity range is obtainable in which the clutch 17 as well as the multi-disc brake 15 are engaged. In this instance, the motor may be driven from the output shaft 14 (motor brake) and additionally the turbine wheel 9 may be put in motion (torque converter brake) whereby a sufficient braking effect can be assured.

According to the present invention, the differential torque converter transmission is directly and co-axially followed by a shiftable gear transmission of the counter-shaft type, while both said differential torque converter transmission and said three-speed shiftable gear transmission are combined to a single structural unit. The output shaft 14 of the differential torque converter transmission simultaneously forms the input shaft of said shiftable gear transmission and has fixedly connected thereto a spur gear 18 meshing with three spur gears 19, 20 and 21 substantially uniformly distributed over the circumference of spur gear 18. The gears 19, 20 and 21 are freely movably mounted on their respective transmission shafts 22, 23 and 24 pertaining thereto and are adapted by means of multi-disc clutches 25, 26, 27 respectively to be selectively coupled with a gear 28, 29, 30 respectively fixedly connected to the respective counter-shaft pertaining thereto. The thus mentioned counter-shaft gears 28, 29 and 30 are, through the intervention of an intermediate gear 31 or gears 33, 34 drivingly connected to output shaft 32 to which the gears 33, 34 are keyed. In this way a rearward speed is obtainable.

In order to shift the counter-shaft transmission into its lowest forward speed, friction clutch 26 is engaged so that the power flow from shaft 14 will be through gears 18, 20, clutch 26, counter-shaft 23 and gears 29, 34 to output shaft 32. For the upper forward speed of the counter-shaft transmission, the disc clutch 25 is engaged and the power flow is effected through elements 18, 19, 25, 22, 28, 33 and 32. For the rearward speed, clutch 27 is engaged so that in view of the intermediate gear 31, a reversal of the direction of rotation with regard to the above-mentioned forward speeds, will be effected.

The diameter of gears 18, 19, 20 and 21 is so selected that a step-up transmission is effected, which means that the counter-shafts 22, 23, 24 will rotate at a higher speed than input shaft 14 and that consequently, these counter-shafts and the transmission elements thereon such as clutches, gears, bearings, etc. have to be dimensioned only relative small. Furthermore, the shiftable clutches are arranged along a common plane perpendicular to the transmission shafts, which fact is advantageous with regard to space-saving. In order to reduce the costs of manufacture, all disc clutches 25, 26, 27 are of identical design.

The supply of pressure fluid to the hydraulically shiftable disc clutches 25, 26, 27 is effected through conduits 35, 36, 37 respectively leading to one end face of the respective counter-shafts 22, 23, 24, and through the central bores 38 in the respective counter-shafts. This type of pressure fluid supply is extremely simple but nevertheless safe in operation.

As will be clearly evident from FIGS. 1 and 3, the arrangement of the counter-shafts in conformity with the present invention does not call for an increase of the transmission diameter required by the torque converter 8. On the other hand, a very compact transmission with short axial length is obtained. Furthermore, FIG. 3 shows that in the intermediate space between the counter-shafts further counter-shafts could be mounted for any desired additional velocity ranges, or auxiliary drives could be arranged therebetween as, for instance, drives for an oil pump, a generator or the like, without requiring an enlargement of the transmission housing.

It will also be evident that the length of the transmission is determined primarily only by the few transmission elements on each counter-shaft, viz. one shiftable clutch and the adjacent two gears and bearings for the shaft. On the other hand, the above-mentioned star-like arrangement of the counter-shafts makes possible the required number of velocity ranges and allows a favorable use of the space surrounding the transmission shaft. Downwardly, upwardly, or laterally protruding transmission structures are avoided.

Due to the step-up gear connections between input shaft and the counter-shafts, the elements of the counter-shafts including the shiftable clutches have to be dimensioned for low torque only, which brings about a further reduction in space requirements and in costs.

Figure 5:
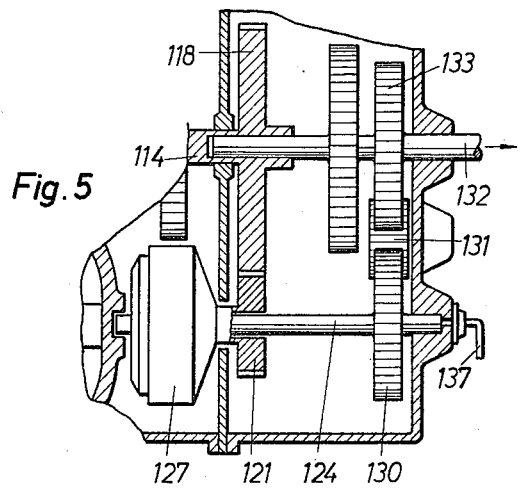
FIG. 5 represents a section similar to that of FIG. 2 but for the embodiment of FIG. 3.

Sometimes, the gear transmission directly following the torque converter is not designed as described above as planetary gear transmission but as a counter-shaft transmission with a shiftable clutch on the counter-shaft of said last-mentioned counter-shaft transmission. In such an instance, it is advantageous to have the output gear of said last-mentioned counter-shaft mesh with the input gear of the shiftable transmission following the differential torque converter transmission and evenly over the circumfernetial range of the transmission output shaft to distribute the counter-shafts of the shiftable transmission and of the above-mentioned counter-shaft transmission directly following the torque converter and replacing the planetary gear transmission. All three or more counter-shafts of the entire transmission structure will then, uniformly distributed, be located around the transmission output shaft. A transmission of this type is illustrated in FIGS. 4 and 5. In these figures, all parts corresponding to those of FIGS. 1 to 3 have been designated with the same reference numerals increased by 100.

As will be seen from the drawings, the arrangement of FIGS. 4 and 5 differs from that of FIGS. 1 to 3, in that hollow shaft 40 connected to turbine wheel 109 and coaxially arranged with regard to central shaft 104 has connected thereto a gear 41. Gear 41 meshes with a gear 43 freely rotatably mounted on counter-shaft 42. Fixedly connected to counter-shaft 42 is a gear 44 meshing with a control gear 118. By selectively engaging and disengaging clutch 45 it is possible drivingly to interconnect and disconnect said gears 43 and 44. In this way, the hydraulic power path through torque converter 108 may be made effective and ineffective similarly to the arrangement of FIG. 1 by engaging and disengaging shiftable brake 45. The other counter-shafts 123, 124 of FIGS. 4 and 5 correspond as to arrangement and effect to counter-shafts 23, 24 of FIGS. 1 to 3 and are adapted selectively to bring about forward and rearward drive.

Furthermore, in distinction over FIGS. 1–3, according to FIGS. 4 and 5, the shiftable clutches 45, 126, 127 of all counter-shafts are located between torque converter 108 and gears 43, 120 and 121 at the input side of the shiftable gear transmission. This arrangement increases the compactness of the transmission according to the invention.

It is, of course, to be understood that the present invention is, by no means, limited to the particular construction shown in the drawings, but also comprises any modifications within the scope of the appended claims.

What we claim is:

1. In combination: a differential torque converter transmission having an input shaft, first planetary gear transmission means having one member connected to said input shaft, a hydrodynamic torque converter comprising a pump wheel drivingly connected to another member of said first planetary gear transmission means and also comprising a turbine wheel, a second planetary gear transmission means having a sun-wheel drivingly connected to said turbine wheel, said second planetary gear transmission means also comprising a planetary gear carrier carrying a plurality of planetary gears meshing with said sun-wheel and being drivingly connected to a third member of said first planetary transmission means, said second planetary gear transmission means furthermore comprising a ring gear in meshing engagement with said planetary gears, said ring gear being freely rotatable about its axis, frictional disc brake means arranged adjacent said ring gear and being operable selectively to brake said ring gear for holding it stationary; a shiftable gear transmission comprising input shaft means fixedly connected to said planetary gear carrier for rotation therewith, output shaft means arranged in axial alignment with said input shaft means, an input gear connected to said input shaft means for rotation therewith, a plurality of countershaft means spaced from and substantially parallel to said input and output shaft means and corresponding in number to the number of velocity ranges of said gear transmission, said countershaft means being arranged around the aligned axes of said input and output shaft means, a pair of countershaft gears respectively mounted on each of said countershaft means, output shaft gear means connected to said output shaft means for rotation therewith, one countershaft gear of each of said pairs being drivingly connected to and being smaller in diameter than said input shaft gear and the other gear of each of said pairs being drivingly connected to said output shaft gear means, one of said countershaft gears of each of said pairs being rotatably mounted on its respective countershaft, and a shiftable, clutch means respectively mounted on each of said countershaft means for connecting one of said rotatably mountted gears to its shaft, each of said clutch means being operable selectively to establish and interrupt driving connection between said input and output shaft means through the respective countershaft means on which the respective clutch means is mounted.

2. In combination: a differential torque converter transmission having an input shaft, a planetary gear transmission means having one member connected to said input shaft, a hydrodynamic torque converter comprising a pump wheel drivingly connected to another member of said planetary gear transmission means and also comprising a turbine wheel, a hollow shaft, arranged coaxially with and connected to said turbine wheel, a first gear drivingly connected to said hollow shaft, said hollow shaft being in axial alignment with said input shaft, said planetary gear transmission means including a third member, a central shaft drivingly connected to said third member and extending through said hollow shaft, a second gear connected to said central shaft for rotation therewith, an output shaft arranged in axial alignment with said central shaft, at least three countershaft means spaced from and substantially parallel to said central shaft and said output shaft and arranged around said last mentioned shafts, a pair of countershaft gears respectively mounted on each of said countershaft means, output shaft gear means connected to said output shaft for rotation therewith, one of said countershaft gears of each of said pairs being drivingly connected to and being smaller in diameter than said second gear, the other gear of a first pair of said countershaft gears being drivingly connected to said first gear, all other gears of all of said other pairs of countershaft gears being drivingly connected to said output shaft gear means, and one of said countershaft gears of each of said other pairs being freely rotatable on the respective countershaft, clutch means said clutch means being operable selectively to establish and interrupt driving connection between said second gear and said output shaft means.

3. An arrangement according to claim 2, in which said shiftable clutch means are of substantially identical shape and size.

4. In a combination according to claim 2, in which friction disk brake means is operable selectively to brake said pump wheel of said converter and in which one of the gears of said first pair is freely rotatable on the respective countershaft and in which a clutch is included for connecting together both of said gears of said first pair whereby said clutch is operable selectively to establish and to interrupt the driving connection between said first and said second gear.

(References on following page)

References Cited by the Examiner

UNITED STATES PATENTS

| | | | |
|---|---|---|---|
| 1,972,176 | 9/1934 | Waseige | 74—359 |
| 2,034,858 | 3/1936 | Buehler | 74—359 |
| 2,260,846 | 10/1941 | Voytech | 74—688 |
| 2,276,258 | 3/1942 | Horowitz | 74—359 X |
| 2,307,619 | 1/1943 | Brewer | 74—331 |
| 2,641,144 | 6/1953 | Schneider | 74—732 |
| 3,023,639 | 3/1962 | Weinrich et al. | 74—688 |
| 3,075,410 | 1/1963 | Weinrich et al. | 74—688 X |
| 3,078,739 | 2/1963 | Weinrich | 74—688 X |
| 3,080,773 | 3/1963 | Lee et al. | 74—360 X |

DAVID J. WILLIAMOWSKY, *Primary Examiner.*

DON A. WAITE, *Examiner.*

T. C. PERRY, *Assistant Examiner.*